(12) United States Patent
Kuhn et al.

(10) Patent No.: US 6,176,223 B1
(45) Date of Patent: Jan. 23, 2001

(54) RADIAL PISTON PUMP FOR HIGH PRESSURE FUEL DELIVERY

(75) Inventors: Uwe Kuhn, Riederich; Thomas Schwarz, Schorndorf, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/402,255

(22) PCT Filed: Oct. 22, 1998

(86) PCT No.: PCT/DE98/03101

§ 371 Date: Oct. 1, 1999

§ 102(e) Date: Oct. 1, 1999

(87) PCT Pub. No.: WO99/40317

PCT Pub. Date: Aug. 12, 1999

(30) Foreign Application Priority Data

Feb. 4, 1998 (DE) .............................................. 198 04 275

(51) Int. Cl.[7] .................................................. F02M 55/02
(52) U.S. Cl. ............................ 123/495; 417/273; 184/6.6
(58) Field of Search ........................... 123/495; 417/273; 184/6.6, 5

(56) References Cited

U.S. PATENT DOCUMENTS

| | | | |
|---|---|---|---|
| 4,671,743 | * | 6/1987 | Frey ...................................... 417/273 |
| 5,382,140 | * | 1/1995 | Eisenbacher et al. ................ 417/273 |
| 5,967,123 | * | 10/1999 | Rouff et al. .......................... 123/495 |
| 5,979,297 | * | 11/1999 | Ricco ................................... 417/273 |

* cited by examiner

Primary Examiner—Thomas N. Moulis
(74) Attorney, Agent, or Firm—Ronald E. Greigg; Edwin E. Greigg

(57) ABSTRACT

A radial piston pump for high-pressure fuel delivery in fuel injection systems of internal combustion engines, with a drive shaft which is supported in a pump housing. The drive shaft has an eccentrically embodied shaft section upon which a ring is supported in sliding fashion by means of a bearing bush. The ring cooperates preferably with a number of pistons disposed radially in relation to the drive shaft each in a respective cylinder chamber. The eccentric shaft section and the ring are fixed in the axial direction by means of stop faces and a bearing gap is provided between the bearing bush and the eccentric shaft section into which gap lubricant travels from the inside of the pump housing. The relationship of the parts improves the supply of lubricant to the bearing gap and the hub end faces of the pump housing are embodied as conical so that a wedge-shaped gap is produced which narrows in the direction of the bearing gap.

8 Claims, 4 Drawing Sheets

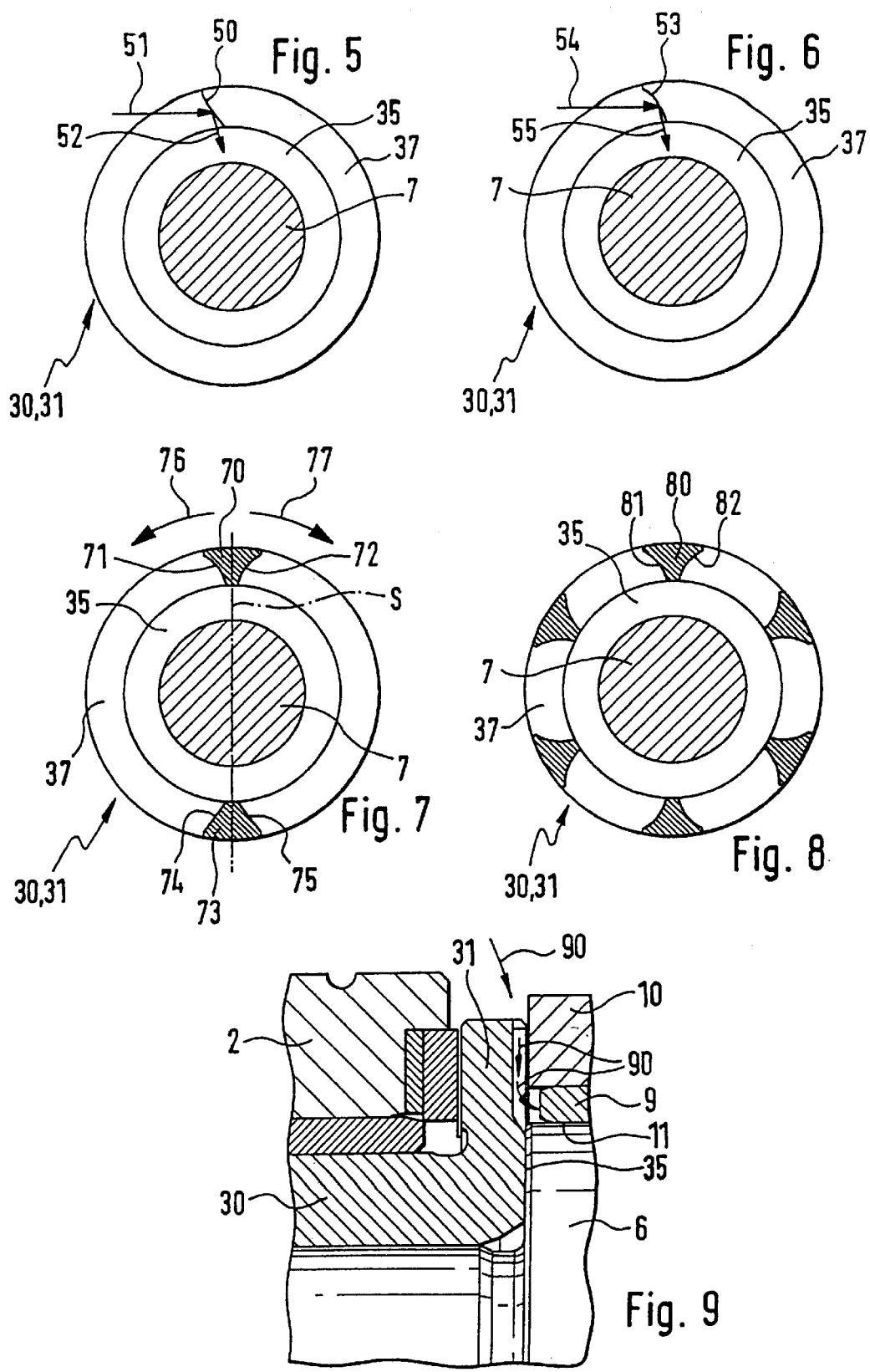

RADIAL PISTON PUMP FOR HIGH PRESSURE FUEL DELIVERY

PRIOR ART

The invention relates to a radial piston pump for high-pressure fuel delivery in fuel injection systems of internal combustion engines, particularly in a common rail injection system, with a drive shaft that is supported in a pump housing and has an eccentrically embodied shaft section upon which a ring is supported in sliding fashion by means of a bearing bush, the ring cooperates preferably with a number of pistons that are disposed radially with regard to the drive shaft, each in a respective cylinder chamber. The eccentric shaft section and the ring are fixed in the axial direction by means of stop faces and a bearing gap is provided between the bearing bush and the eccentric shaft section, into which lubricant can travel from the inside of the pump housing.

An object of the invention is to improve the supply of lubricant to the bearing gap in order to assure a lubricating film with a full bearing capacity.

A radial piston pump for high-pressure fuel delivery in fuel injection systems of internal combustion engines, particularly in a common rail injection system. The piston pump has a drive shaft that is supported in a pump housing and has an eccentrically embodied shaft section upon which a ring is supported in sliding fashion by means of a bearing bush. The ring cooperates preferably with a number of pistons that are disposed radially with regard to the drive shaft, each in a respective cylinder chamber. The the eccentric shaft section and the ring are fixed in the axial direction by means of stop faces and a bearing gap is provided between the bearing bush and the eccentric shaft section, into which lubricant can travel from the inside of the pump housing. An object of the invention is attained by virtue of the fact that the hub end faces of the pump housing are embodied as conical so that a wedge-shaped gap is produced which narrows in the direction of the bearing gap. As a result, the connection between the inner chamber of the pump housing and the bearing gap is enlarged and the entry of lubricant into the bearing gap is encouraged.

One particular embodiment of the invention is characterized in that the hub end faces on the back side of the stop collar are embodied by axial bearings. When the drive shaft is driven by the engine, for example by way of diagonally toothed gears, this results in the fact that forces are exerted on the shaft in the axial direction. In this instance, it is advisable to install an axial slide bearing which absorbs the axial forces. In an axial slide bearing of this kind, the back side of the stop collar of the flange bush can, for example, be inclined in order to produce a wedge-shaped gap. As a result, the supply of lubricant to the bearing gap is improved.

Another particular embodiment of the invention is characterized in that the hub end faces have at least one blade which is aligned on one side so that the lubricant is fed from the pump housing to the bearing gap. The delivery of lubricant is counteracted by centrifugal force, which interferes with the lubricant supply. If only one blade is attached to the stop face, it must be precisely positioned so that the lubricant is delivered to the correct location in the bearing gap. Providing a number of blades is in fact more expensive in the manufacturing, but offers the advantage that mounting them in a position-oriented fashion is not required.

Another particular embodiment of the invention is characterized in that the blade is embodied as symmetrical with regard to a radial. The symmetrical design of the blade has the advantage that the feeding action is produced independent of the rotational direction of the drive shaft.

Another particular embodiment of the invention is characterized in that the blade surface is embodied as flat. The flat blades have the advantage that they are simple and inexpensive to produce.

Another particular embodiment of the invention is characterized in that the blade surface is embodied as curved. With the curved blades, more lubricant can be fed into the bearing gap, because this form is more favorable from a technical flow standpoint.

Other advantages, features, and details of the invention ensue from the description below, in which various exemplary embodiments are described in detail with reference to the drawings. In this connection, the features mentioned hereinafter in the description can be essential to the invention by themselves or in arbitrary combinations with one another.

BRIEF DESCRIPTION OF THE DRAWINGS

FIGS. 5 to 8 show different embodiment forms of the blades which are each represented in a section along the line A-B depicted in FIG. 4; and FIG. 9 shows another embodiment of the current invention.

DETAILED DESCRIPTION

Radial piston pumps are particularly used in common rail injection systems for supplying fuel to diesel engines. In this connection, "common rail" means the same thing as "common line" or "common distributor rail". In contrast to conventional high-pressure injection systems, in which the fuel is supplied to the individual combustion chambers by way of separate lines, the fuel injectors in common rail injection systems are supplied from a common line.

Figure 1:
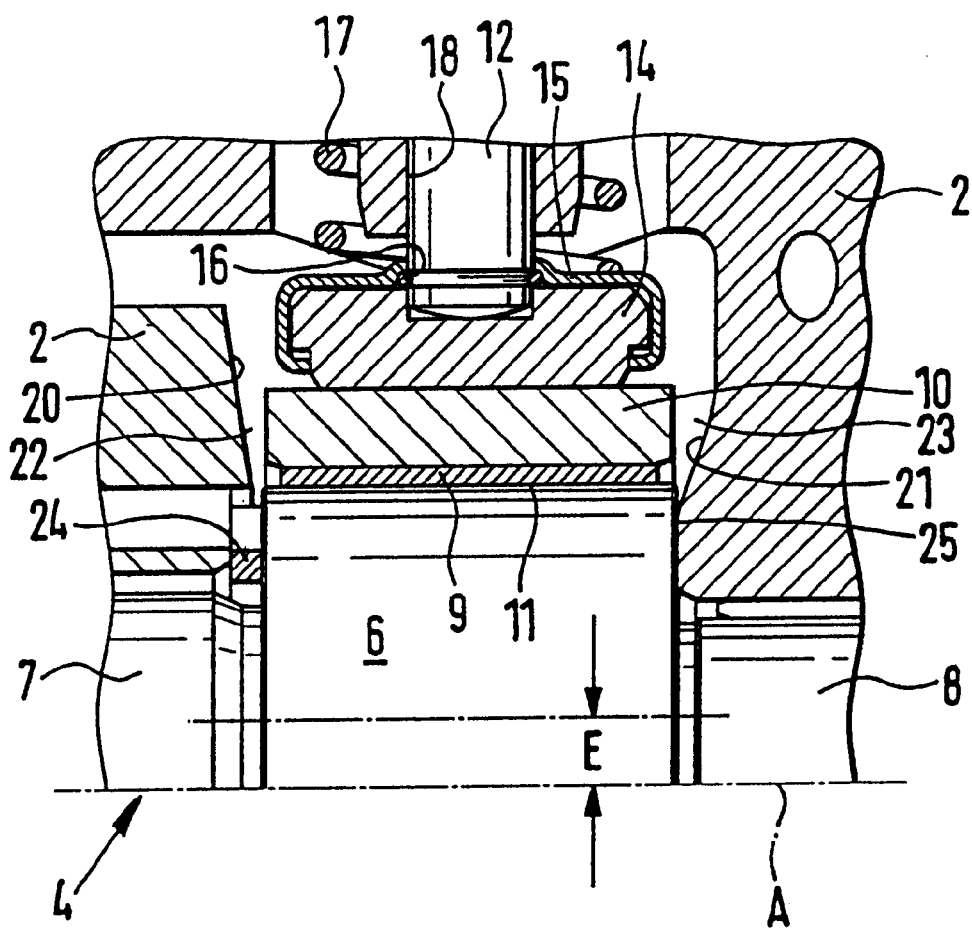
FIG. 1 shows a partial view of a section lengthwise to the drive shaft of a first embodiment of a radial piston pump according to the invention.

The radial piston pump, which is only partially depicted in a sectional view in FIG. 1, includes a drive shaft 4 which is supported in a pump housing 2 and has an eccentrically embodied shaft section 6. Two shaft pins 7, 8, which are rotatably supported in the housing, extend from the eccentric shaft section 6. The drive shaft 4 is driven so that no forces occur in the axial direction. A ring 10 is supported in sliding fashion on the eccentric shaft section 6 by means of a bearing bush 9.

A bearing gap 11 is provided between the bearing bush 9 and the eccentric shaft section 6.

A number of pistons 12 are supported against the ring 10. In one preferred embodiment, there are three pistons 12, wherein the pistons are respectively offset from one another by 120° and each rest against a flattening embodied on the ring 10. A plate 14 is provided between the piston 12 and the ring 10. The plate 14 is held against the piston 12 by a plate retainer 15. The plate retainer 15 is fastened to the piston 12 by a snap ring 16. A spring 17 rests against the plate retainer 15 and presses the plate 14 against the ring 10.

The pistons 12 are each contained in a cylinder chamber 18 so that they can reciprocate in a radial direction in relation to the drive shaft 4. The radial piston pump shown in FIG. 1 is used to exert high pressure on fuel that is supplied from a tank by a pre-feed pump. The fuel that is acted on with high pressure is then delivered into the common line mentioned above. In the feed stroke, the pistons 12 are moved away from the drive shaft 4 due to the eccentric motion of the ring 8. In the suction stroke, the pistons 12 move radially toward the drive shaft in order to aspirate fuel into the cylinder chambers 18.

Lubricant (not shown) is disposed on the inside of the pump housing 2. In order to improve the supply of lubricant from the inside of the pump housing into the bearing gap 11, bevels 20, 21 are provided on the hub end faces in the inner chamber. Two wedge-shaped gaps 22, 23 are embodied between the bevels 20, 21 and the ring 10. The eccentric shaft section 6 is fixed by means of a stop disc 24 and a stop face 25, which is embodied in the inner chamber of the housing. The ring 10 is likewise fixed axially by means of the stop disc 24 and the stop face 25, but on the opposite side in relation to the axis A of the drive shaft 4, which is not shown in FIG. 1. As indicated by the datum of the eccentricity E, in the eccentric position depicted in FIG. 1, the plate 14 has the maximal distance from the axis A. This means that the piston 12 is disposed at the top dead center.

Figure 2:
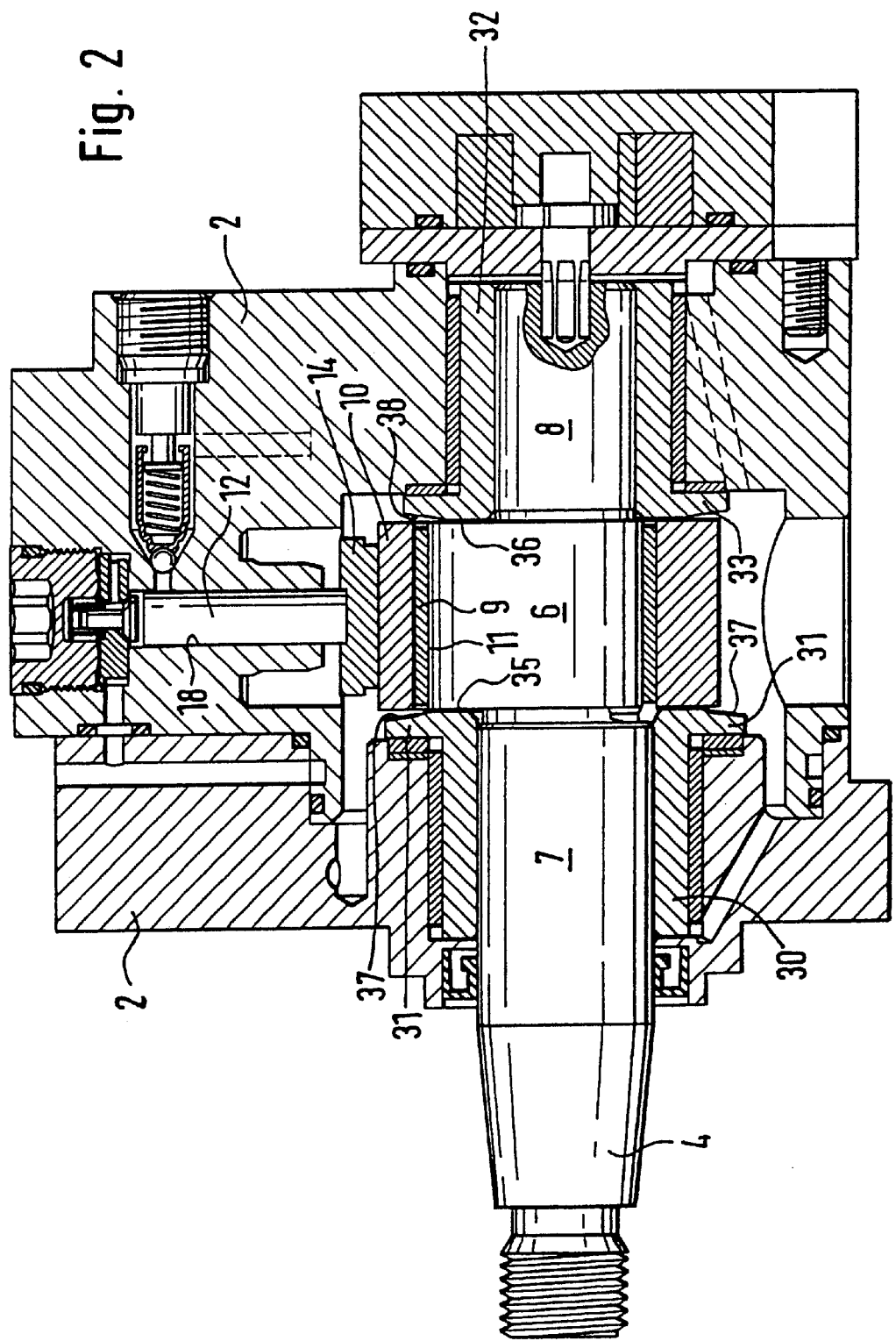
FIG. 2 shows the view of a section lengthwise to the drive shaft of a second embodiment of a radial piston pump according to the invention.

FIG. 2 shows a second embodiment of a radial piston pump according to the invention which is similar to the radial piston pump, a detail of which is shown in FIG. 1. For the sake of simplicity, the same parts are indicated with the same reference numerals. A drive shaft 4 with an eccentric shaft section 6 is supported so that it can rotate in a pump housing 2. A shaft pin 7 of the drive shaft 4 is supported so that it can slide radially and axially by means of a flange bush 30 with a collar 31. A shaft pin 8 of the drive shaft 4 is supported so that it can slide radially and axially by means of a flange bush 32 with a collar 33. The flange bushes 30 and 32 are disposed so that the collars 31 and 33 are oriented toward each other. The eccentric shaft section 6, can be rotated in relation to a ring 10 with a bearing bush 9, and is disposed between the collars 31 and 33.

Figure 3:
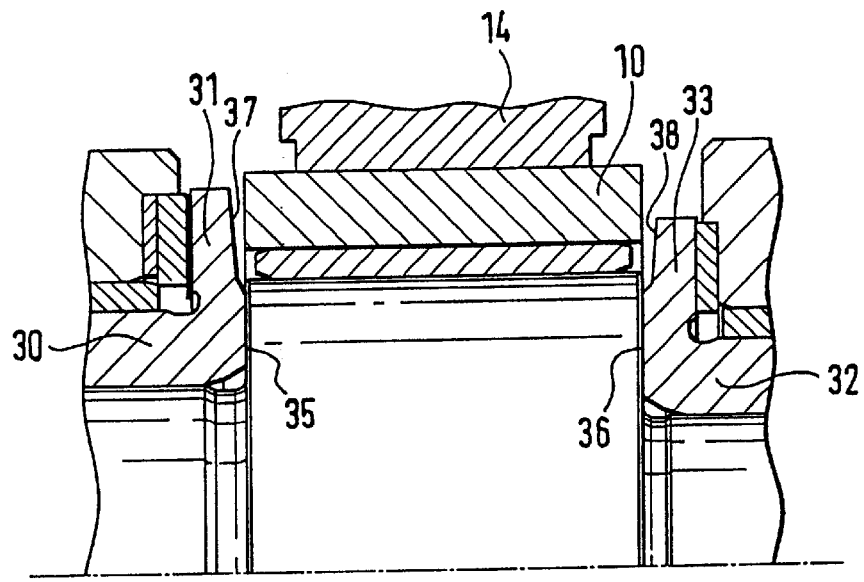
FIG. 3 shows the bearing gap from FIG. 2 in an enlarged partial view.

For the purpose of axial fixing, the end faces of the eccentric shaft section 6 rest against contact faces 35, 36, which are embodied on the end faces of the collars 31, 33. In addition bevels 37, 38 are provided on the end faces of the collars 31, 33, as can best be seen in the enlarged partial depiction of FIG. 3. The bevels 37, 38 assure that sufficient lubricant can travel from the inside of the pump housing 2 into a bearing gap 11, which is embodied between the bearing bush 9 and the circumference face of the eccentric shaft section 6. The bearing gap 11 is associated with a radial slide bearing, which permits the rotation of the eccentric shaft section 6 in relation to the ring 10.

During operation, the eccentric motion of the eccentric shaft section 6 is transmitted by way of the bearing bush 9, the ring 10, and a plate 14 to a piston 12, which can reciprocate in a cylinder chamber 18.

Figure 4:
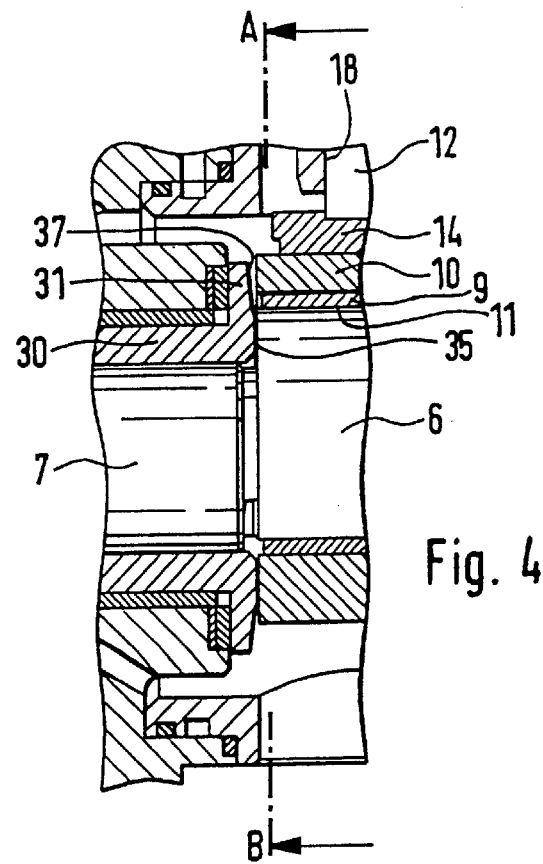
FIG. 4 shows a detail from the radial piston pump depicted in FIG. 2.

FIG. 4 shows another detail from FIG. 2, from which the progression of the sections shown in FIGS. 5 to 9 can be seen. In the FIGS. 5 to 9, the shaft pin 7 is shown in cross-section. The contact face 35 of the collar 31 of the flange bush 30 is disposed concentric to the shaft pin 7. The contact face 35 is encompassed by the bevel 37 to which the various blades are attached so that lubricant is fed inward in the radial direction.

The embodiment shown in FIG. 5 has a blade 50 that is embodied as flat and is slightly inclined in relation to a radial. The arrows 51 and 52 indicate the feed direction of the lubricant when the drive shaft with the flange bush 30 is rotating counter-clockwise.

The embodiment shown in FIG. 6 has a blade 53 that is embodied as curved and is slightly inclined in relation to a radial. The arrows 54 and 55 indicate the feed direction of the lubricant when the drive shaft with the flange bush 30 is rotating counter-clockwise.

The embodiment shown in FIG. 7 has two diametrically opposing blades 70 and 73. The blade 70 has two concave surfaces 71 and 72, which are embodied symmetrically to one another in relation to a symmetry axis S. The thickness of the blade 70 increases from the inside toward the outside. The blade 73 has a similar structure to the blade 70. The only difference between the blades 70 and 73 is comprised in that the surfaces 74 and 75 of the blade 73 are embodied as flat. The symmetrical embodiment of the blades 70 and 73 makes it possible for lubricant to be fed into the bearing gap in both rotation directions 76, 77.

FIG. 8 shows an embodiment in which a number of blades 80 with curved surfaces 81, 82 are affixed to the bevel 37. This has the advantage that the positioning of the flange bush 30 in relation to the eccentric shaft section 6 (see FIG. 4) during assembly is no longer important.

FIG. 9 shows that instead of being embodied as wedge-shaped, the gap provided between the collar 37 and the end face of the ring 10 can also be embodied as parallel. By means of one or more blades, however, more lubricant is fed into the bearing gap 11 than in conventional radial piston pumps, as indicated by the arrows 90.

The foregoing relates to a preferred exemplary embodiments of the invention, it being understood that other variants and embodiments thereof are possible within the spirit and scope of the invention, the latter being defined by the appended claims.

What is claimed is:

1. A radial piston pump for high-pressure fuel delivery in fuel injection systems of internal combustion engines having a common rail injection system, comprising a drive shaft (4) which is supported in a pump housing (2) and has an eccentrically embodied shaft section (6) upon which a ring (10) is supported in sliding fashion by means of a bearing bush (9), the ring (10) cooperates with a number of pistons (12) disposed radially in relation to the drive shaft (4), each piston in a respective cylinder chamber (18), the eccentric shaft section (6) and the ring (10) are fixed in the axial direction by means of stop faces (24, 25) and a bearing gap (11) is provided between the bearing bush (9) and the eccentric shaft section (6) into which gap lubricant can travel from the inside of the pump housing (2), the hub end faces (20, 21, 37, 38) of the pump housing (2) are embodied as conical so that a wedge-shaped gap is produced which narrows in a direction of the bearing gap (11).

2. The radial piston pump according to claim 1, in which the hub end faces (37, 38) are embodied by axial bearings (31, 33) on a back side of the stop collar.

3. The radial piston pump according to claim 2, in which the hub end faces (37, 38) have at least one blade (50, 53), which is aligned on one side so that lubricant is fed from the pump housing (2) to the bearing gap (11).

4. The radial piston pump according to claim 3, in which the blades (70, 73, 80) are embodied as symmetrical in relation to a radial (S).

5. The radial piston pump according to claim 3, in which the blade surface (50, 74, 75) is embodied as flat.

6. The radial piston pump according to claim 4, in which the blade surface (50, 74, 75) is embodied as flat.

7. The radial piston pump according to claim 3, in which the blade surface (53, 71, 72) is embodied as curved.

8. The radial piston pump according to claim 4, in which the blade surface (53, 71, 72) is embodied as curved.

* * * * *